United States Patent [19]

Alkofer

[11] Patent Number: 4,677,465
[45] Date of Patent: Jun. 30, 1987

[54] DIGITAL COLOR IMAGE PROCESSING METHOD WITH SHAPE CORRECTION OF HISTOGRAMS USED TO PRODUCE COLOR REPRODUCTION FUNCTIONS

[75] Inventor: James S. Alkofer, Hamlin, N.Y.

[73] Assignee: Eastman Kodak Company, Rochester, N.Y.

[21] Appl. No.: 794,033

[22] Filed: Nov. 1, 1985

[51] Int. Cl.[4] .......................... G03F 3/08; H04N 1/46; G03B 27/80
[52] U.S. Cl. ........................................ 358/80; 358/75; 355/38
[58] Field of Search .................... 358/75, 76, 78, 80, 358/280, 283, 284, 256; 382/18; 355/38, 35, 40, 41, 77, 88, 68

[56] References Cited

U.S. PATENT DOCUMENTS

| | | | |
|---|---|---|---|
| 4,090,243 | 5/1978 | Kotera et al. | 358/75 |
| 4,410,909 | 10/1983 | Ueda et al. | 358/75 |
| 4,467,364 | 8/1984 | Konagaya | 358/76 |
| 4,472,736 | 9/1984 | Ushio et al. | 358/75 |

OTHER PUBLICATIONS

"A New Approach to Programming in Photomechanical Reproduction", by Yu. Ovchinnikov et al., W. Banks IPC Science and Technology Press, Guildford, England, 1974, pp. 160–163, Twelfth Annual Conference of Printing Research Institutes.
"Tone Correction of Color Picture by Histogram Modification", by Yoichi Miyake; Nippon Shashin Sakhaishi, V. 48(2), pp. 94–101, 1980.
"A Statistical Method for Image Classification and Tone Reproduction Determination", by R. Chung, Journal of Applied Photographic Engineering, vol. 3, No. 2, Spring, 1977, pp. 74–81.
Abramowitz, Milton, et al., Editors, *Handbook of Mathematical Functions*, Sixth Printing, Nov. 1967, with Corrections, National Bureau of Standards, pp. 931–933.

Primary Examiner—James J. Groody
Assistant Examiner—Randall S. Svihla
Attorney, Agent, or Firm—Thomas H. Close

[57] ABSTRACT

In a method for processing digital color images derived from photographic film, the method employing color reproduction functions generated by normalizing random samples of color values from different colors, sampling of color values from noisy areas of an image, or scanner noise can distort the randomness of sampling and result in unwanted contrast reductions and color shifts in the processed digital images. The problem is solved by correcting the shapes of the distributions of color value samples toward normal distributions having the same means and standard deviations as the sample distributions prior to forming the color reproduction functions.

3 Claims, 12 Drawing Figures

FIG. 5
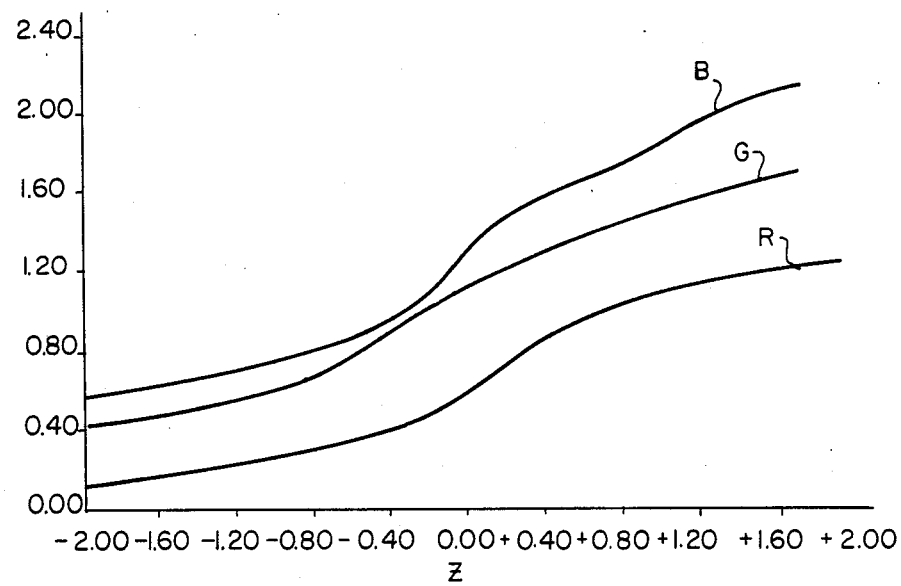
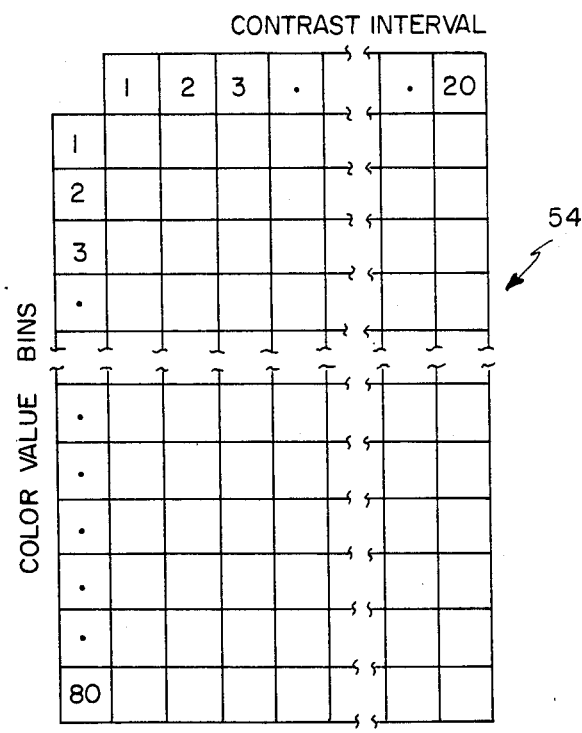
FIG. 7

DIGITAL COLOR IMAGE PROCESSING METHOD WITH SHAPE CORRECTION OF HISTOGRAMS USED TO PRODUCE COLOR REPRODUCTION FUNCTIONS

TECHNICAL FIELD

The present invention relates to a method of processing a digital color image derived from photographic film, and more particularly to such a method employing a plurality of color reproduction functions generated by normalizing samples of color values selected from the informational portions of the image, the color reproduction functions being applied to the digital color image to produce a processed digital color image.

BACKGROUND ART

A digital image processing method has been proposed wherein a random sample of tone values from the informational portion of the digital image is normalized to produce a tone reproduction function. The tone reproduction function is then applied to the digital image to produce a processed digital image. This procedure was first proposed in the article entitled "A New Approach to Programming in Photomechanical Reproduction" by Yu. Ovchinnikov et al., 12th IARIGAI Conference Proceedings, Versailles, France, Editor W. Banks, IPC Science and Technology Press, Guildford, England, 1974, pages 160-163. It has been discovered that the success of the method depends strongly upon choosing a truly random sample of tone values from the image. An improvement to the randomness of the sampling by selecting the tone values from a "floating" image-dependent contrast interval having certain preferred statistical properties is disclosed in U.S. patent application Ser. No. 730,630, filed May 6, 1985, by the present inventor. A further improvement, wherein the overall contrast of the image is adjusted as a function of the standard deviation of the tone values of the image and the tone reproduction function is expressed in terms of the standard normal variate is disclosed in U.S. patent application Ser. No. 730,629, filed May 6, 1985, by the present inventor.

An extension of the method to processing digital color images to adjust both tone scale and color balance is disclosed in U.S. patent application Ser. No. 730,627, filed May 6, 1985, by the present inventor. In the extension to digital color images, a color reproduction function is produced for each of a plurality of color components (e.g. red, green and blue) in the digital image by normalizing respective samples of color values selected from the informational part of the image. The color reproduction functions thus produced are then applied to the respective color components of the digital color image to produce the processed digital color image. An output device is calibrated so that combinations of color values having equal values of the standard normal variate in the color reproduction functions produce a neutral (gray) color.

This method generally produces an aesthetic improvement in the appearance of processed color images. However, when the digital color image is derived from a color photographic film image containing textures such as noisy blue sky, foliage or film grain noise due to underexposure, or when noise is introduced by the image scanner, the randomness of the sampling procedure for producing the samples of color values for normalization is subject to influence, thereby distorting the color reproduction functions and causing unwanted contrast reduction or color shifts in the processed images.

It is apparent from the examination of such processed images that further improvement in the digital color image processing method is desirable.

It is the object of the present invention to provide an improved digital color image processing method of the type described above, wherein the tone scale of processed images having textured or noisy areas are improved.

DISCLOSURE OF THE INVENTION

The object of the invention is achieved by correcting the shapes of the distributions of color values toward a normal distribution having the same mean and standard deviation as the sample distributions prior to forming the color reproduction functions.

In a preferred practice of the method, the correction comprises forming the cumulative probabilities of the samples of color values, forming a normal set of cumulative probabilities having the same mean and standard deviation as the sample distributions, and forming the square roots of the joint probabilities of the two sets of cumulative probabilities. Finally, the posterior probabilities are computed from the joint probabilities.

FIG. 2 is a graph showing how a color reproduction function is generated. The upper left-hand quadrant of the graph shows a histogram labeled A of a sample of color values (photographic densities) taken from an informational portion of the image. The sample is plotted against relative frequency of occurrence. The lower right-hand quadrant of the graph shows a histogram labeled B of a normal (Gaussian) distribution showing the relative frequency of occurrence vs the standard normal variate Z. The standard variate Z is a scale in units of standard deviations of a Gaussian distribution. In the upper right-hand quadrant is shown a transformation function labeled C that transforms the distribution of the measured sample of color values to the normal distribution. This color reproduction function relates any given color value in the measured distribution to a value of Z. The Z value is a dimensionless quantity representing numbers of standard deviations. To process the digital image, the measured color values in the digital color image are converted to Z values using the color reproduction functions. The resulting dimensionless quantities are given dimensions by multiplying the Z values by a constant to determine the contrast of the processed image, and adding a constant to the Z values in the respective colors to adjust the color balance of the processed image. The additive constants are chosen such that equal Z values in all three colors produce a neutral (gray) color.

If the samples of color values used to generate the color reproduction function were not truly random, the shapes and relationships of the color reproduction functions will be distorted, resulting in undesirable contrast reduction and color shifts in the processed image.

FIG. 3 shows an actual set of red, green and blue color reproduction functions labeled R, G and B, respectively, that were generated according to the process described above, from a photographic negative having an extremely underexposed background. The kinks in the middle of the color reproduction functions are due to the non-random sampling caused by the film grain. They result in a distorted tone scale in portions of the processed image.

The present invention is motivated by the theorem of Bayesian statistics which says, in effect, that the statistics of the joint probabilities between an expected prior distribution and a random sample of a sampling distribution will better represent the statistics of the actual distribution then will the statistics of the random sample alone. The basic assumption of the image processing method as originally proposed by Ovchinnikov et al. was that a random sample of tone values taken from the informational portion of the image will form a normal distribution. Therefore, applying the above noted theorem, the shape of the histogram of the actual sample of color values is corrected such that the translation of the original image moves toward a normal distribution.

This is accomplished, according to the present invention, by taking the square roots of the joint probabilities between the actual sample and a normal distribution having the same mean and standard deviation as the actual sample. FIG. 4 shows a plot of probability density vs. photographic density of an actual sample of color values for one of the three color layers, taken from the same image from which the color reproduction functions shown in FIG. 3 were generated. The solid curve in FIG. 4 represents the original data, the chain curve represents a normal distribution having the same mean and standard deviation as the sample distribution, and the dotted curve represents the square root of the joint probability of the two distributions. The step of histogram shape correction was first applied to all three color samples, then the color reproduction functions were generated by normalizing the shape-corrected histograms, resulting in the set of color reproduction functions shown in FIG. 5. The image reproduced with this set of color reproduction functions was noticeably improved with respect to the image produced from the color reproduction functions shown in FIG. 3.

In many cases, the histogram shape correction method has resulted in a visual improvement in the processed image, and in no instance has the histogram shape correction method resulted in a degradation of the processed image.

BRIEF DESCRIPTION OF THE DRAWINGS

FIG. 5 is a plot of a set of color reproduction functions generated according to the method of the present invention;

FIG. 7 is a schematic diagram illustrating the organization of histogram memories used to compile color value histograms in the apparatus shown in FIG. 6.

MODES OF CARRYING OUT THE INVENTION

Figure 1:
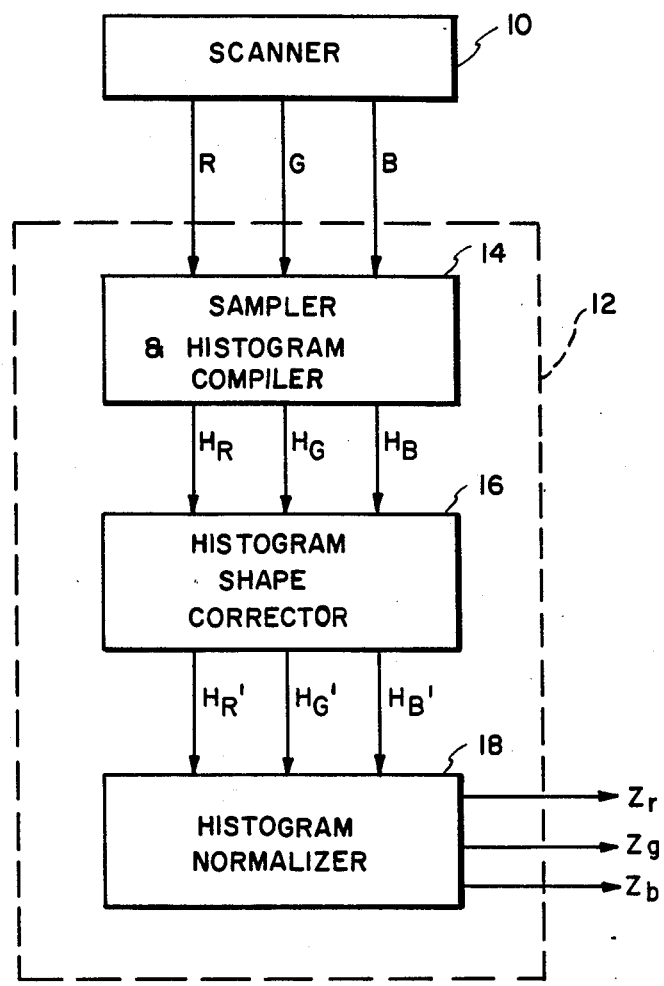
FIG. 1 is a block diagram illustrating apparatus for performing the basic steps of generating color reproduction functions according to the present invention.

The method of digital color image processing according to the present invention will first be described with reference to FIG. 1. In FIG. 1, a scanner 10 scans a color film image to provide a digital color image signal having three color components R, G and B. A digital computer 12 receives the digital color image signal and is programmed, as described below, to provide a sampler and histogram compiler 14 for sampling the color values from the informational portion (edges) of the digital image and compiling histograms $H_R$, $H_G$, and $H_B$ of the sampled color values in the respective colors. A histogram shape corrector 16 corrects the shapes of the histograms toward normal histograms having the same mean and standard deviation as the sample histogram to produce shape-corrected histograms $H_R'$, $H_G'$, and $H_B'$. A histogram normalizer 18 receives the shape-corrected histogram data $H_R'$, $H_G'$, and $H_{B'}$ and generates a set of functions $Z_r$, $Z_g$ and $Z_b$ that normalize the respective histograms. The functions $Z_r$, $Z_g$ and $Z_b$ are the color reproduction functions employed to process the color digital image as described below.

Figure 6:
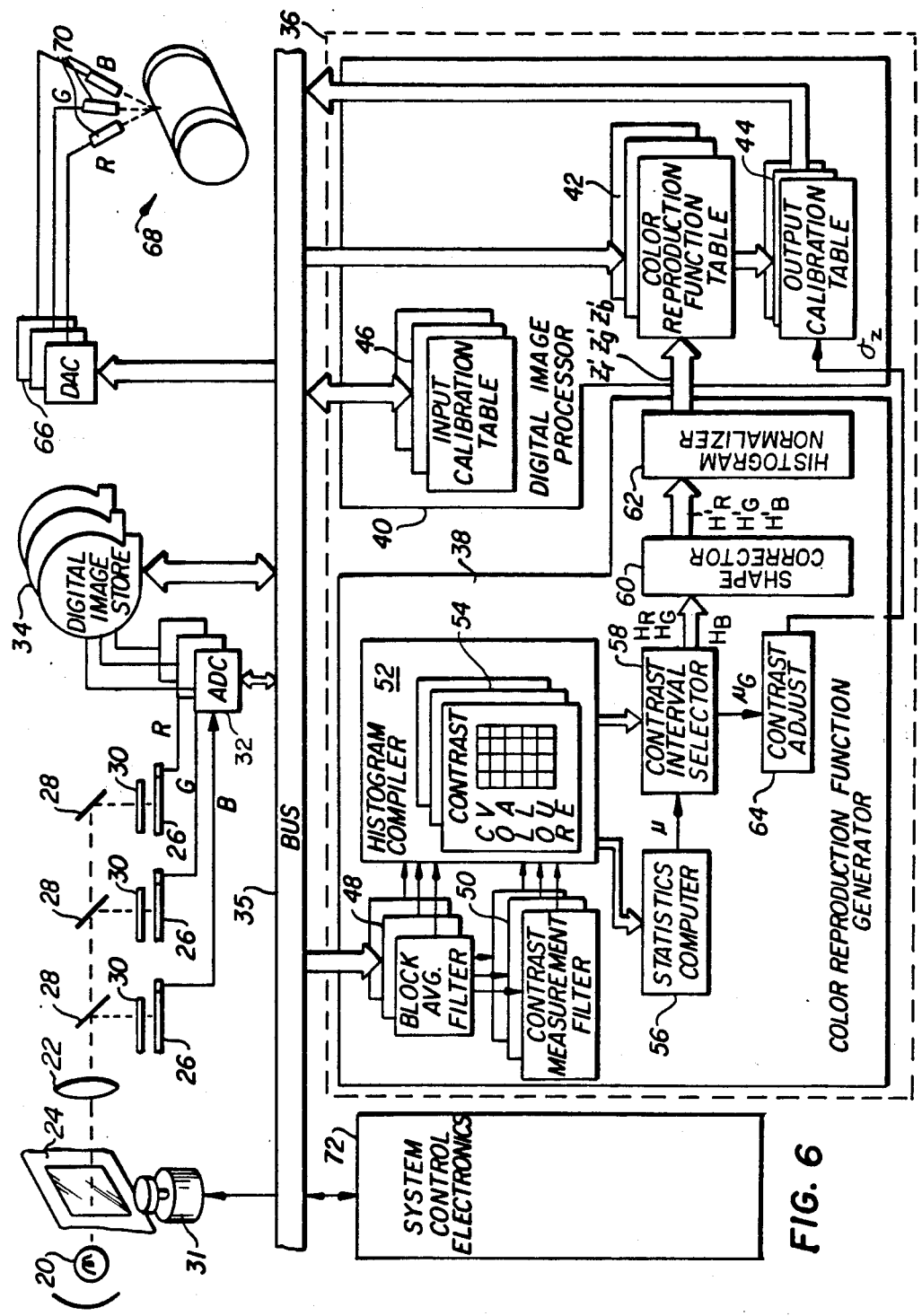
FIG. 6 is a schematic diagram showing scan printing apparatus for practicing the present invention.

Turning now to FIG. 6, an example of a scanning printer used to practice the present invention will be described. The input device includes a light source 20 and lens 22 for projecting an image of color negative film 24 onto three solid state image sensing arrays 26, such as CCD image sensors. The image is directed to the image sensing array 26 by dichroic beam splitters 28 through color trimming filters 30, to form a red, green and blue separation image on the respective image sensors 26. A film advance motor 31 advances the film in the printer. The image sensors 26 scan the color photographic negatives to produce three color separation signals R, G and B. The signals thus produced are supplied to analog-to-digital converters 32 that each produce an 8-bit output code representing one of 256 possible signal levels for each sample point in the three colors.

The digital color image signals are stored in a digital image storage memory 34, such as a magnetic tape, disc, or solid state semiconductor memory. The digital color image signals were processed in a digital computer 36. A DEC 2060 mainframe computer was used in the initial experiments, and later a special-purpose digital image processing computer was used to increase the processing speed.

The digital computer 36 is programmed to include a color reproduction function generator 38 and a digital image processor 40 that applies color reproduction functions generated by color reproduction function generator 38 to the digital color image. The color reproduction function generator 38 receives the color digital image from the digital image storage device 34 via data and control bus 35 and generates a color reproduction function for each color. The color reproduction functions are supplied to the digital image processor 40 as color reproduction function look-up tables 42 that are used to process the digital color image. The color reproduction function generator 38 also generates a multiplicative constant $\sigma_z$ for adjusting the contrast of the processed image as described below and supplies the constant to output calibration tables 44 in the digital image processor 40.

Prior to storing the digital color image in digital image store 34, each input signal level is converted to an input color value (such as photographic density), by a known scanner calibration function. The calibration function for each color is implemented in the form of a look up table 46 in the digital image processor 40 to convert each 8-bit input value to an 8-bit value representing the color negative density at the scanning point.

The color reproduction function generator 38 includes digital filters 48 for performing a block average of the color values of the digital color image. Digital filters 50 detect the contrast of the image around each block-averaged color value in each of the three colors. A histogram compiler 52 compiles the block averaged color values from a plurality of contrast intervals in each color in a plurality of histogram memories 54.

FIG. 7 shows, in a graphic way, the organization of one of the histogram memories 54 for one of the colors. There are twenty contrast intervals having a width of 0.04 log contrast units each. The width of the contrast intervals was chosen to be approximately twice the minimum visual log contrast threshold. The 256 color values are divided into 80 color value (density) bins, for a resolution of 0.05 density units per bin. Counts are accumulated in the appropriate color value bins in the histogram memories 54 until all of the color values from the digital color image are counted.

Returning to FIG. 6, a statistics computer 56 computes the first four standardized statistical moments $\mu$ of the distributions of color values in the histogram memories 54 as described below.

A contrast interval selector 58 selects a contrast interval on the basis of the statistics of the distributions of color values in the contrast intervals. The contrast interval selector 58 supplies the color value histograms $H_R$, $H_G$, $H_B$ from the selected contrast interval to a histogram shape corrector 60. The histogram shape corrector 60 corrects the shapes of each of the color value histograms $H_R$, $H_G$, $H_B$ toward a normal histogram having the same mean and standard deviation as the color value histogram. The shape-corrected histograms $H_R'$, $H_B'$, $H_G'$ are applied to a histogram normalizer 62. Histogram normalizer 62 normalizes the shape-corrected histograms $H_R'$, $H_G'$, $H_B'$ of color values from the selected contrast interval to generate the color reproduction functions $Z_r$, $Z_g$ and $Z_b$.

A contrast adjustment computer 64 receives the statistics $\mu_G$ of the green distribution from the contrast interval selector 58 and produces a multiplicative constant $\sigma_z$ used to determine the contrast of the processed image. The multiplicative constant $\sigma_z$ is provided to the output device calibration tables 44. Alternatively, the multiplicative constant $\sigma_z$ can be incorporated into the color reproduction function tables 42. The color reproduction function look-up tables 42 relate each of the 256 possible input values in the respective colors to one of the 256 possible output values.

After the color reproduction function look-up tables 42 have been generated, the digital image processor 40 processes the digital image by applying the color reproduction functions to the respective color components of the digital color image. The output calibration functions are then applied to the respective color components of the processed digital color image. The processed digital color image is converted to analog form by digital-to-analog converters 66. The processed analog color signal is then applied to an output scanning device 68 to reproduce the processed color image.

The output device 68 is a drum-type scanner having red, green and blue laser light sources 70 that are modulated by the respective analog color signals to expose a light-sensitive medium such as color photographic paper.

System control electronics 72 controls and coordinates the operation of input and output scanning devices and the signal processing computer.

The method of digital color image processing using shape-corrected histograms will now be described in more detail with reference to the flow charts of FIGS. 8–12.

Referring first to the flow chart of FIG. 8, the processing steps performed on the digital color image to generate the respective color reproduction functions will be described. All three color components are processed through these steps. First a block average of the color values of the sampled digital image is formed. This is accomplished by applying a digital filter to the digital image color values of the form:

$$\begin{bmatrix} 1 & 1 & 1 & 1 \\ 1 & 1 & 1 & 1 \\ 1 & 1 & 1 & 1 \\ 1 & 1 & 1 & 1 \end{bmatrix} / 16 \tag{1}$$

Figure 2:
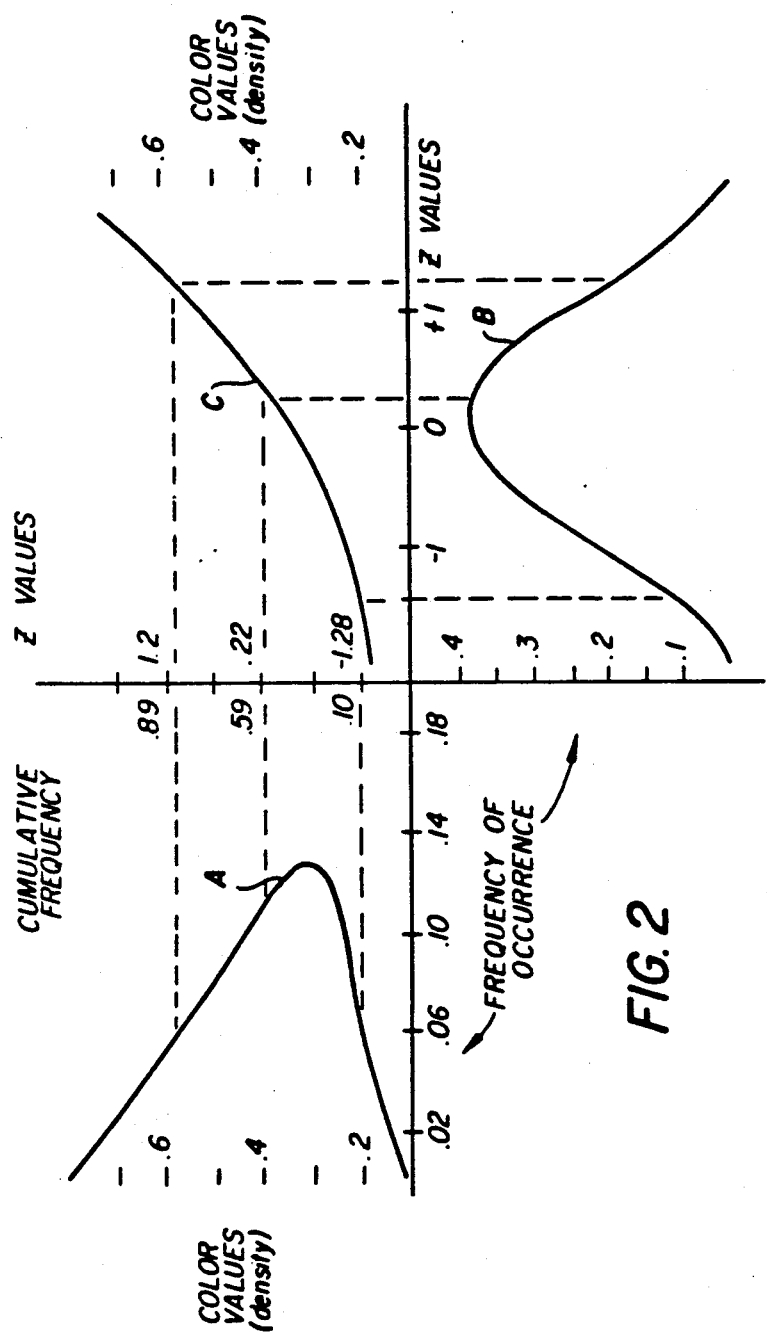
FIG. 2 is a graph useful in describing the generation of the color reproduction function.
Figure 3:
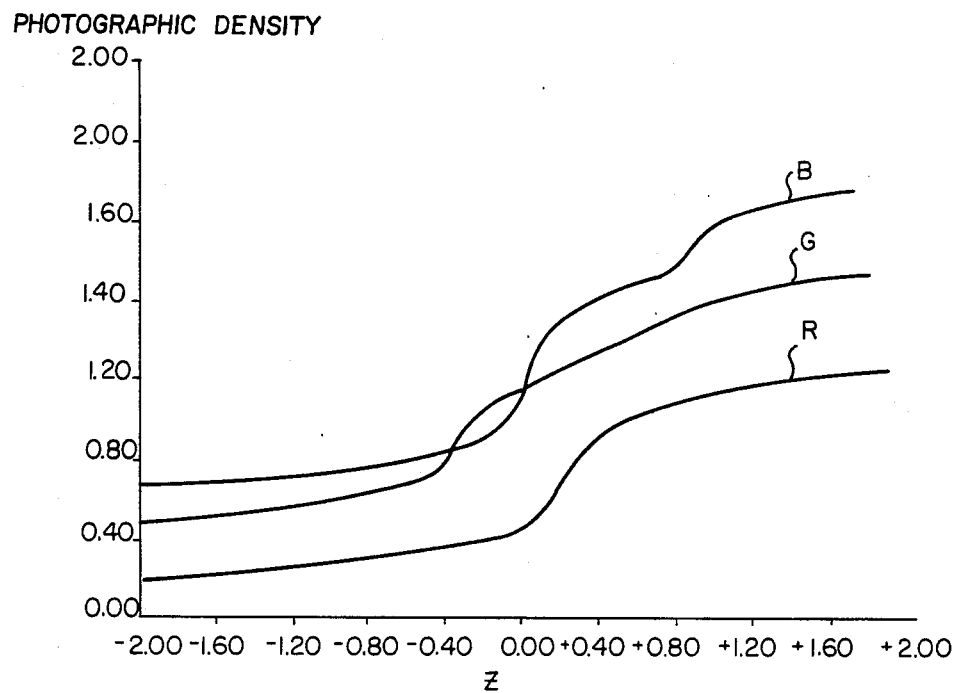
FIG. 3 is a plot of a set of color reproduction functions generated according to the prior-art method.
Figure 4:
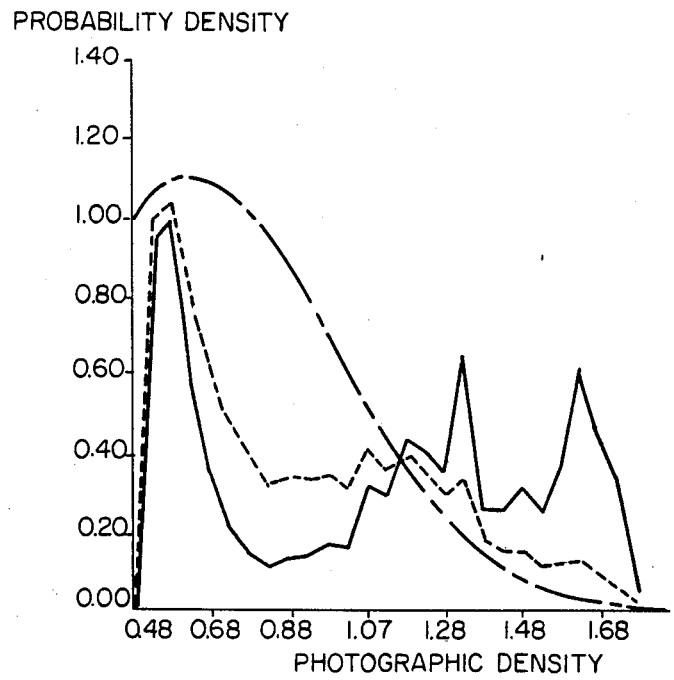
FIG. 4 is a graph illustrating the correction of histogram shape according to the present invention.

This averaging is performed by the block average filters 48 shown in FIG. 2 to reduce the effects of film grain on the color value statistics.

Next, a digital filter representing a Laplacian operator of the form:

$$\begin{bmatrix} 0 & -1 & 0 \\ -1 & 4 & -1 \\ 0 & -1 & 0 \end{bmatrix} \tag{2}$$

is applied to the block averaged color values of the digital color image to measure the contrast of the image at each block averaged sample point. This operation is performed by the contrast measurement filter 50 in FIG. 6. The Laplacian operator has the properties of exhibiting no response to uniform areas or linear gradients, and exhibits a response only to changes in gradients. The Laplacian operator works well in measuring the contrast of the image; however, it is to be understood that other contrast measuring filters may be employed.

The respective histograms in each contrast interval for each color component are compiled as discussed above, and their statistics are computed. A contrast interval is selected on the basis of the statistical parameters of the color value distributions in the contrast interval. The shapes of the histograms are corrected toward a normal histogram having the same mean and standard deviation, and the shape-corrected histograms of color values in the selected contrast interval are normalized to generate the respective color reproduction functions for each color.

An overall contrast adjustment parameter $\sigma_z$ is calculated as a function of the standard deviation of the green color values in the selected contrast interval.

Figures 8, 9:
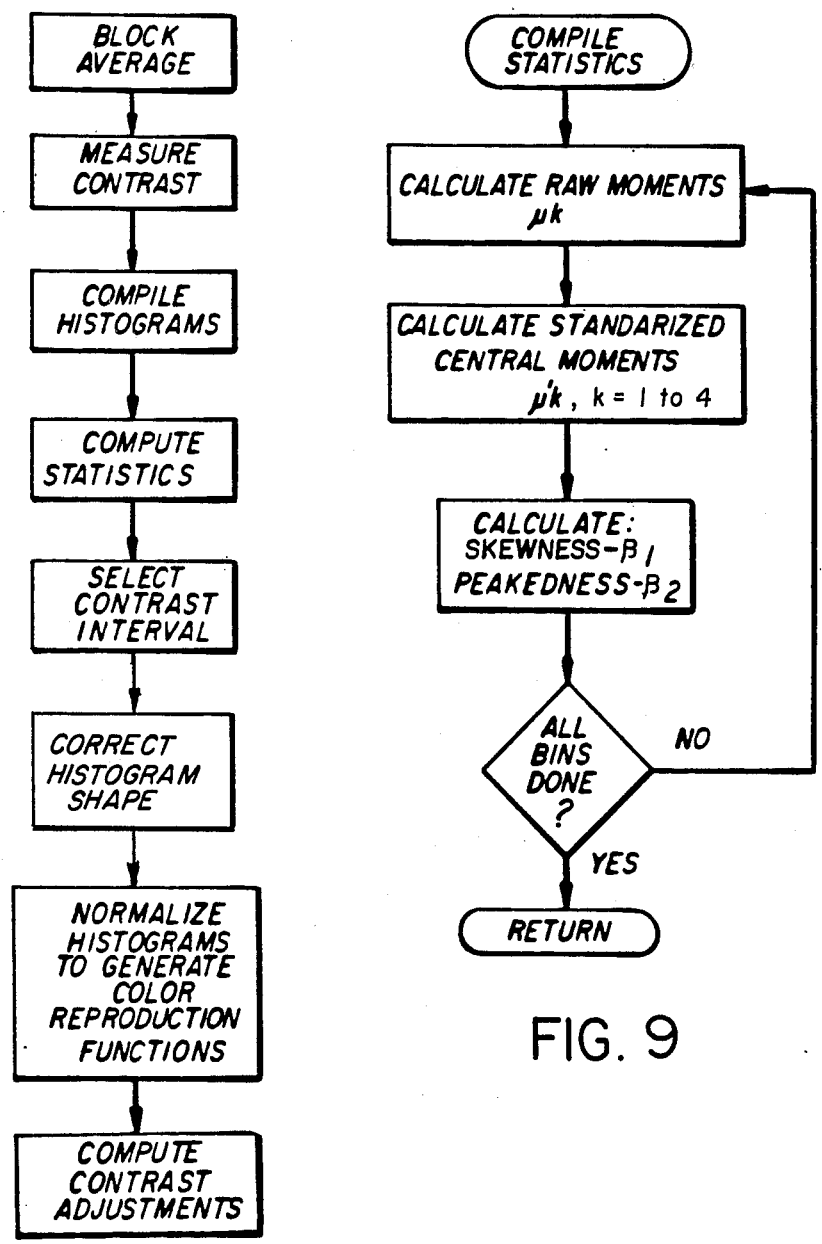
FIGS. 8 through 12 are flow charts illustrating the operation of the apparatus of FIG. 6 according to the present invention.

FIG. 9 is a flow chart showing the steps involved in compiling the histogram statistics for each contrast interval value. The raw moments $\mu_k$ taken about the mean are computed as follows:

$$\mu_k = \frac{1}{N} \left[ \sum_{i=1}^{N} (x_i - \bar{x})^k \right] \quad (3)$$

where
N is total number of samples in the contrast interval;
$\bar{x}_i$ is a color value; and
x is the mean color value.

The standardized central moments $\mu'_k$ are calculated as follows:

$$\mu'_k = \frac{\mu_k}{\sigma^k}, \text{ where } \sigma = \sqrt{\mu_2} \quad (4)$$

The coefficient of symmetry (skewness) for each distribution is then represented as $$\beta_1 = (\mu'_3)^2 \quad (5)$$

and the coefficient of peakedness (kurtosis plus 3) is represented as $$\beta_2 = \mu'_4 \quad (6)$$

Figures 10, 12:
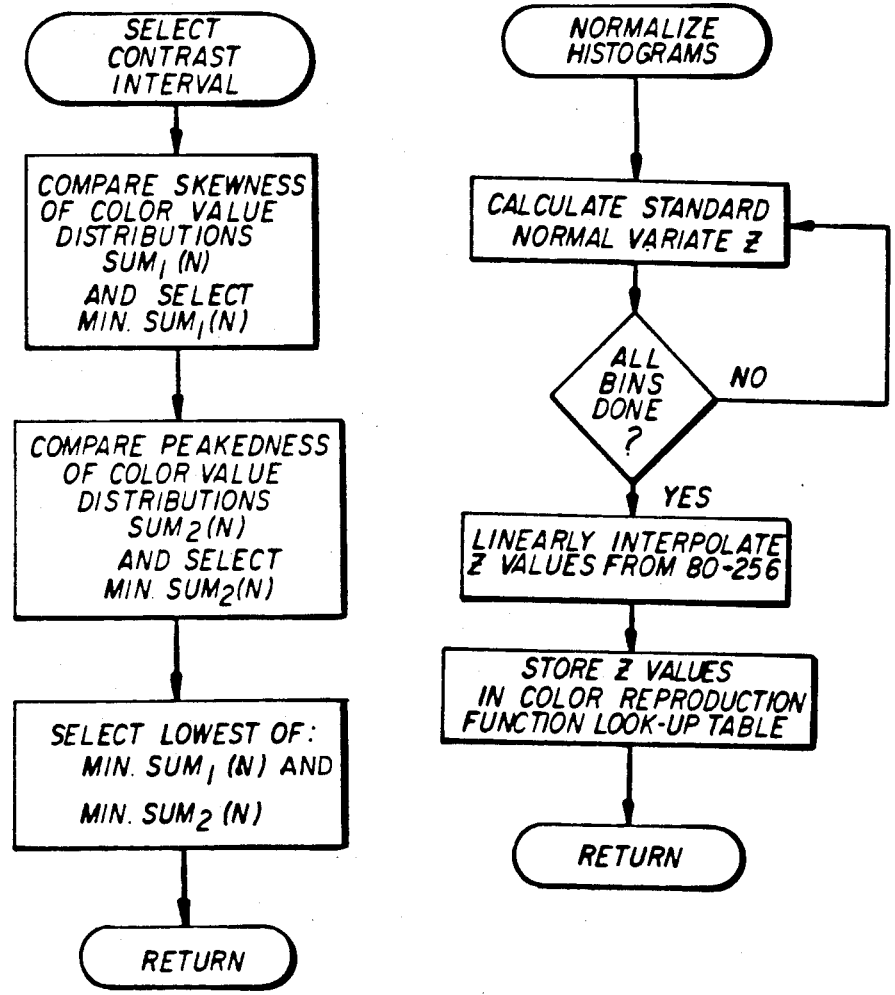

Referring to FIG. 10, the contrast interval selection criteria involves the similarity of shape of the three color distributions in the contrast interval. The selection criteria compares the skewness of the color value distributions in each of the contrast intervals as follows:

$$SUM_1(N) = |\beta_{1R} - \beta_{1G}| + |\beta_{1B} - \beta_{1G}| + |\beta_{1R} - \beta_{1B}| \quad (7)$$

where $SUM_1(N)$ is a measure of the difference in skewness between the three color value distributions in the Nth contrast interval. The contrast interval having the most similar distribution, i.e. the lowest value of the $SUM_1(N)$, is identified.

Next, the peakedness of the three color value distributions in each contrast interval is compared as follows:

$$SUM_2(N) = |\beta_{2R} - \beta_{2G}| + |\beta_{2B} - \beta_{2G}| + |\beta_{2R} - \beta_{2B}| \quad (8)$$

where $SUM_2(N)$ is a measure of difference in peakedness between the three color value distributions in the Nth contrast interval. The contrast interval having the most similar distributions, i.e. the lowest value of $SUM_2(N)$, is identified.

Finally, the lowest contrast interval (i.e. the interval representing the lowest contrast between the two identified contrast intervals is selected.

Figure 11:
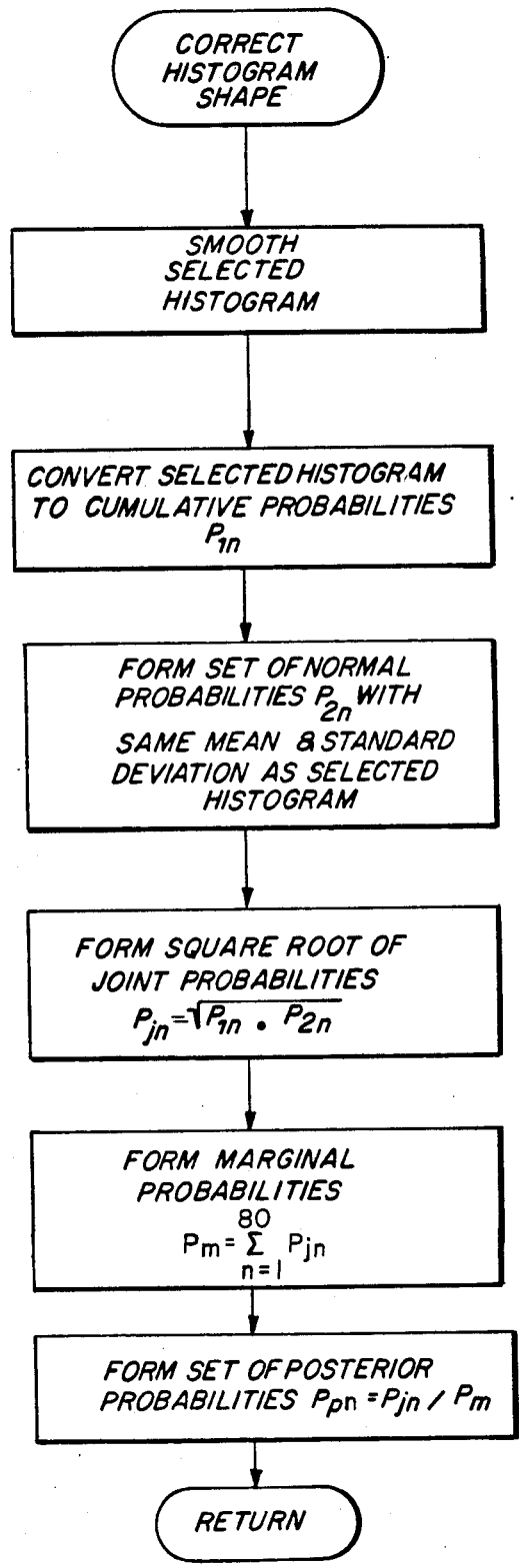

Turning now to FIG. 11, the steps involved in correcting the shapes of the selected color value histograms will be described.

First an average smoothing operation is performed on the selected color value distribution to remove any spikes. The smoothing is performed on the counts in 3 consecutive color value bins as follows:

$$h_i = \tfrac{1}{3}(h'_{i-1} + h'_i + h'_{i+1}) \quad (9)$$

where
$h'_i$ is the count in bin i and
$h_i$ is the smoothed value.

Next, the smoothed color value histograms are converted to cumulative probabilities $P_{1n}$ as follows:

$$P_{1n} = \frac{\sum_{i=1}^{n} h_i}{\sum_{i=1}^{80} h_i} \quad (10)$$

Then, a set of normal cumulative probabilities $P_{2n}$ having the same mean and standard deviation as each of the selected histograms are formed as follows (from *Approximations for Digital Computers*, Hastings, C., Princeton Univ. Press):

$$P_{2n} = 1 - Z(y_n)(b_1 t + b_2 t^2 + b_3 t^3 + b_4 t^4 + b_5 t^5) + \epsilon(y_n) \quad (11)$$

where $$|\epsilon(y_n)| < 7.5 \times 10^{-8}; \; t = \frac{1}{1 + py_n}$$

$$y_n = \frac{x_n - \bar{x}}{\sigma} \quad p = .23164\;19$$

$b_1 = .31938\;1530 \quad b_4 = -1.82125\;5978$
$b_2 = -.35656\;3782 \quad b_5 = 1.33027\;4429$
$b_3 = 1.78147\;7937$ and $$Z(y_n) = \frac{1}{\sqrt{2\pi}} e^{\frac{-y_n^2}{2}}$$

Next, the square roots of the joint probabilities $P_{jn}$ of the two sets of cumulative probabilities are formed as follows:

$$P_{jn} = \sqrt{P_{1n} \cdot P_{2n}} \quad (12)$$

The marginal probabilities $P_m$ of the square roots of the joint probabilities is computed as:

$$P_m = \sum_{i=1}^{80} P_{jn} \quad (13)$$

and the posterior probabilities $P_{pn}$ of the square roots of the joint probabilities are found as follows. The posterior probabilities are the cumulative probabilities of the shape-corrected histogram.

$$P_{pn} = P_{jn}/P_m \quad (14)$$

Turning now to FIG. 12, the steps involved in normalizing the color value histograms to generate the color reproduction functions will be described. To normalize a histogram, the normal variate Z for all 80 color value bins in the contrast interval is computed. The normal variate Z is calculated from the cumulative probabilities $P_{pn}$ of the shape-corrected histogram as follows (from *Approximations for Digital Computers*, Hastings, C., Princeton Univ. Press):

$$Z_n = t_n - \frac{a_0 + a_1 t_n}{1 + b_1 t_n + b_2 t_n^2} + \epsilon(P_{pn}) \quad (15)$$

where $$|\epsilon(P_{pn})| < 3 \times 10^{-3} \quad t_n = \sqrt{\ln(1/P_{pn}^2)}$$

-continued $a_0 = 2.30753 \quad b_1 = .99229$
$a_1 = 0.27061 \quad b_2 = .04481$ The 256 Z values are stored in the color reproduction function look-up table 42. This process is applied to each of the three color value samples in the selected contrast interval.

After the color reproduction function look-up tables are generated, all of the color values of the image are processed by applying the respective color reproduction functions to them. At this point, the processed color values from the image are dimensionless quantities representing Z values.

To recover the processed image, these dimensionless quantities are given magnitudes with respect to the original image and the output medium by multiplying the Z values with a multiplier that adjusts the overall contrast of the processed image. To adjust the color balance of the image, a constant term is added to each of the three primary tone values. The additive constant term relates the processed image values to the density of the output medium for the respective color, thereby causing equal Z values in all three colors to be reproduced as a shade of gray.

Appropriate values for the multiplier that adjusts the overall contrast and the additive constants that determine the color balance are determined as follows. The multiplier is computed based on the statistics of the green color values alone, but is applied to all three colors.

The intrinsic contrast of natural scenes can be quantified in terms of the standard deviation of log reflectance of edges in the scene or the density representation of these log reflectances in the photographic image. On the average the approximate relationship between the two is given by:

$$\sigma_D = \overline{G} \cdot \sigma_R \quad (16)$$

where:
$\overline{G}$ = average gradient of the photographic film (relates $\sigma_R$ to some specific reproduction medium contrast)
$\sigma_R$ = standard deviation of log reflectance based on a large number of original scenes
$\sigma_D$ = standard deviation of density Typical values for $\sigma_R$ and $\overline{G}$ for color negative photographic film are 0.31 and 0.68 respectively, such that $\sigma_D$ is 0.21. Departures from this average contrast must be compensated. A general equation may be stated as:

$$\sigma_z = m \cdot f(\sigma_s) + b \quad (17)$$

where:
$\sigma_s$ = individual scene standard deviation, from the selected contrast interval
m and b are system dependent constants and
$f(\sigma_s)$ is some function of the sample standard deviation
$\sigma_z$ = the multiplier applied to the values obtained from the color reproduction function.

A simple and satisfactory implementation is obtained from:

$$b = \sigma_D \cdot (1.0 - m) \quad (18)$$

$$\sigma_z = m \cdot \sigma_s + b \quad (19)$$

where:
m is typically between 0.6 and 0.8.

The sign of $\sigma_z$ is positive if the reproduction has the same polarity as the original image (negative-to-negative or positive-to-positive). If the reproduction has a polarity of an opposite sense with respect to the original, e.g., negative-to-positive, then the sign of $\sigma_z$ is negative.

For example, if a color negative image is to be printed directly onto color photographic paper, the log exposure for the desired mean paper density for each color is simply added to the translated, contrast adjusted values of the respective colors. The complete calculation is given by:

$$\log E_{ZD} = -\sigma_z \cdot Z_D + \log E_A \quad (20)$$

where:
$\log E_A$ = log exposure required to obtain the aim paper density
$Z_D$ = translated Z value for some input density in the original image
$\log E_{ZD}$ = log exposure for $Z_D$.

Industrial Applicability and Advantages

The method of processing digital color images according to the present invention is useful in the graphic arts and photographic printing fields to automatically adjust the local contrast and color balance of digital color images produced from photographic color film. The method is advantageous in that a greater percentage of high quality images are produced automatically, without the need for operator intervention, than by the methods of the prior art. The method overcomes the problem of undesirable color shifts and tone scale problems caused by noise in the samples of color values employed to generate the color reproduction functions.

I claim:

1. In a method of processing a digital color photographic image by applying color reproduction functions formed by normalizing samples of color values from informational portions of the image to color values of the digital image, each of said samples of color values forming a distribution of color values having a characteristic shape, the improvement comprising the step of: correcting the shapes of the distributions of color values toward normal distributions having the same mean and standard deviation as the respective distributions of color values prior to forming the color reproduction functions.

2. The digital color photographic image processing method claimed in claim 1, wherein the step of correcting comprises forming a first set of cumulative probabilities from each of the distributions of color values, forming a second set of normal cumulative probabilities for each of the distributions of color values having the same mean and standard deviation as the respective distribution of color values, and forming the square roots of the joint probabilities of the two sets of cumulative probabilities for each of the distributions of color values.

3. The digital color photographic image processing method claimed in claim 2, further comprising the step of forming the posterior probabilities of the square roots of the joint probabilities for each of the distributions of color values; and forming said color reproduction functions from said posterior probabilities.

* * * * *